(12) United States Patent
Wang

(10) Patent No.: US 9,439,196 B2
(45) Date of Patent: Sep. 6, 2016

(54) ELECTRONIC KEY CONVEY SOLUTION FOR IN-HOSPITAL MEDICAL BODY AREA NETWORK (MBAN) SYSTEMS

(71) Applicant: KONINKLIJKE PHILIPS N.V., Eindhoven (NL)

(72) Inventor: Dong Wang, Scarsdale, NY (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/359,374

(22) PCT Filed: Dec. 4, 2012

(86) PCT No.: PCT/IB2012/056931
§ 371 (c)(1),
(2) Date: May 20, 2014

(87) PCT Pub. No.: WO2013/084139
PCT Pub. Date: Jun. 13, 2013

(65) Prior Publication Data
US 2014/0342766 A1 Nov. 20, 2014

Related U.S. Application Data

(60) Provisional application No. 61/566,760, filed on Dec. 5, 2011.

(51) Int. Cl.
*H04W 72/04* (2009.01)
*H04W 12/04* (2009.01)
(Continued)

(52) U.S. Cl.
CPC .......... *H04W 72/0453* (2013.01); *H04L 63/20* (2013.01); *H04W 12/04* (2013.01);
(Continued)

(58) Field of Classification Search
CPC ... H04W 16/14; H04W 48/04; H04W 84/18; H04W 72/0453; H04W 12/04; H04W 74/002; H04W 67/12; H04W 84/22; H04L 63/20
See application file for complete search history.

(56) References Cited

U.S. PATENT DOCUMENTS 8,417,215 B2 * 4/2013 Baldus et al. ............. 455/404.2
8,442,607 B2 * 5/2013 Banet et al. ................. 600/324
(Continued)

FOREIGN PATENT DOCUMENTS

WO 2010100446 A1 9/2010
WO 2011124995 A1 10/2011
(Continued)

OTHER PUBLICATIONS

Smith, Delroy, Comments of Philips Healthcare Systems Oct. 10, 2009, 67 pages.*
(Continued)

*Primary Examiner* — Lewis West

(57) ABSTRACT

An electronic key conveyance system (10) of a medical institution (14) includes a control point (70). The control point (70) receives one or more electronic keys from a coordinator (12) of an MBAN spectrum. Each of the electronic keys authorizes the medical institution (14) to use at least a portion of the MBAN spectrum. The system (10) further includes a channel regulator (72) generating by a processor (80) one or more channel use rules based on the electronic keys. The channel use rules authorize MBAN systems (18, 20, 22) of the medical institution (14) to use the at least a portion of the MBAN spectrum. Even more, the system (10) includes one or more access points and/or ports (74, 76) notifying the MBAN systems (18, 20, 22) of presently authorized portions of the MBAN spectrum based on the channel use rules. The electronic key is based on the available spectrum of primary users like AMT, the rules are based on a key and the spectrum already occupied by other MBANs and their nodes. The frequency range of used 802.15.4j is 2360 MHz to 2390 MHz or 2360 MHz to 2400 MHz. Cognitive radio principles are applied.

20 Claims, 3 Drawing Sheets

(51) Int. Cl.
*H04L 29/06* (2006.01)
*H04W 74/00* (2009.01)
*H04W 16/14* (2009.01)
*H04W 84/18* (2009.01)
*H04L 29/08* (2006.01)
*H04W 84/22* (2009.01)

(52) U.S. Cl.
CPC ......... *H04W 16/14* (2013.01); *H04W 74/002* (2013.01); *H04L 67/12* (2013.01); *H04W 84/18* (2013.01); *H04W 84/22* (2013.01)

(56) References Cited

U.S. PATENT DOCUMENTS

| | | | |
|---|---|---|---|
| 8,483,720 B2* | 7/2013 | Farahani et al. | 455/456.5 |
| 2008/0015903 A1* | 1/2008 | Rodgers | 705/3 |
| 2008/0160984 A1* | 7/2008 | Benes et al. | 455/419 |
| 2008/0183910 A1* | 7/2008 | Natoli et al. | 710/15 |
| 2008/0221399 A1* | 9/2008 | Zhou et al. | 600/301 |
| 2008/0221951 A1* | 9/2008 | Stanforth et al. | 705/7 |
| 2009/0191906 A1* | 7/2009 | Abedi | 455/501 |
| 2009/0311960 A1* | 12/2009 | Farahani et al. | 455/41.2 |
| 2010/0261429 A1 | 10/2010 | Batra et al. | |
| 2012/0071098 A1* | 3/2012 | Chebbo et al. | 455/41.2 |
| 2012/0089370 A1* | 4/2012 | Chebbo et al. | 702/188 |
| 2012/0092155 A1* | 4/2012 | Abedi | 340/539.12 |
| 2013/0017791 A1* | 1/2013 | Wang et al. | 455/41.2 |
| 2013/0316652 A1* | 11/2013 | Wang et al. | 455/41.2 |
| 2014/0065972 A1* | 3/2014 | Wang | 455/41.2 |
| 2014/0342766 A1* | 11/2014 | Wang | 455/509 |

FOREIGN PATENT DOCUMENTS

| | | |
|---|---|---|
| WO | 2011128795 A1 | 10/2011 |
| WO | 2011128796 A1 | 10/2011 |

OTHER PUBLICATIONS

Evans, D.; Proposal in Response to Task Group 802.15.4j Call for Proposals; 2011; IEEE-SA Mentor; 802(2)1-16.

Chen, et al., "Wireless Body Sensor Network With Adaptive Low-Power Design for Biometrics and Healthcare Applications", IEEE Systems Journal, vol. 3, No. 4, Dec. 2009.

* cited by examiner

| MBAN Device Type | Rule Version Num | Effective Time/Date | Expiration Time/Date | Prioritised Candidate Channel List |
|---|---|---|---|---|
| (1) Type-B | 1 | 2011-7-02 12:01am | 2011-9-02 12:00am | {18,0,1,2,...,7,8,30,31,32,...,38} |
| (2) Type-B | 2 | 2011-9-02 12:01am | 2011-10-02 12:00am | {9,30,31,32,...,38} |
| (3) Type-B | 1 | 2011-10-02 12:01am | N/A | {18,0,1,2,...,7,8,30,31,32,...,38} |

| Healthcare Facility ID | MBAN Device Type | Rule Version Num | Expiration Time/Date | Prioritised Candidate Channel List |
|---|---|---|---|---|

ELECTRONIC KEY CONVEY SOLUTION FOR IN-HOSPITAL MEDICAL BODY AREA NETWORK (MBAN) SYSTEMS

CROSS REFERENCE TO RELATED APPLICATIONS

This application is a national filing of PCT application Ser. No. PCT/IH2012/056931, filed Dec. 4, 2012, published as WO 2013/084139 A1 on Jun. 13, 2013, which claims the benefit of U.S. provisional application Ser. No. 61/566,760 filed Dec. 5, 2011, which is incorporated herein by reference.

The present application relates generally to wireless communication. It finds particular application in conjunction with medical body area network (MBAN) systems and will be described with particular reference thereto. However, it is to be understood that it also finds application in other usage scenarios, and is not necessarily limited to the aforementioned application.

There is a general trend in the healthcare industry towards expanding care services, such as patient monitoring, to general wards and even beyond the physical hospital boundaries. Medical body area networks (MBANs) are one of the key enabling technologies for ubiquitous monitoring services. An MBAN is a wireless network of sensors around a patient used for monitoring a patient's physiological data. MBAN communication standards include, for example, IEEE 802.15.6 and IEEE 802.15.4j being developed by the Institute of Electrical and Electronics Engineers (IEEE). The clinical benefits of MBANs include, but are not limited to, extension of monitoring into care areas that are currently unmonitored; improved healthcare workflow efficiency, safety and clinical outcome; patient mobility, comfort, and infection control; monitoring flexibility and scalability; and reduced overall monitoring costs.

A typical MBAN system includes several tiny sensor devices placed on a patient's body to capture physiological data of the patient, such as heart rate and electriocardiogram (ECG) signals. The captured data is forwarded to a hub device through a short-range and low-power MBAN. The hub device can be a local bedside monitoring unit, a cell phone, a set-top-box, or other wireless device and usually has a connection to a backhaul network (e.g., a cellular network, a LAN, etc.), through which the collected data is further transferred to a monitoring system. The monitoring system is responsible for analyzing patients' physiological data and provides monitoring, diagnosing or treating services in real time.

Considering the significant social and economic benefits of MBAN systems, the medical industry has lobbied the Federal Communications Commission (FCC) to open the 2360-2400 MHz band (hereafter "the MBAN spectrum") to MBAN systems on a secondary basis. As a result, the FCC is drafting regulation rules for use of the MBAN spectrum for MBAN systems. Thanks to the wide bandwidth, interference-free and good propagation properties of the MBAN spectrum, it is very likely that most MBAN systems will use the MBAN spectrum to provide medical-grade connectivity if the FCC opens the MBAN spectrum to MBAN systems.

The proposed allocation of the MBAN spectrum is on a secondary basis, meaning MBAN systems employing the MBAN spectrum would have to protect primary users, such as aeronautical mobile telemetry (AMT) users. In order to protect the primary users, the FCC is considering several rules that regulate secondary use of the 2360-2400 MHz band. According to one rule, MBAN operations in 2360-2390 MHz are limited to medical institutions only, and MBAN operations in 2390-2400 MHz can be anywhere, including medical institutions, patient homes, and ambulatory vehicles. According to another rule, medical institutions need to register with an MBAN coordinator to obtain access to the 2360-2390 MHz spectrum, while the 2390-2400 MHz spectrum is always available for MBAN use. The MBAN coordinator issues an electronic key to a registered medical institutions. The electronic key includes information about which portions of the MBAN spectrum are authorized for use by the registered medical institutions.

One challenge with these rules is that each registered medical institution needs to automatically deploy electronic keys received from the MBAN coordinator to all the MBAN systems operating within the medical institution to regulate their access to the 2360-2390 MHz band. Therefore, an electronic key convey solution is needed for in-hospital MBAN systems. The present application provides new and improved methods and systems which provide such a solution.

In accordance with one aspect, an electronic key conveyance system of a medical institution is provided. The system includes a control point receiving one or more electronic keys from a coordinator of an MBAN spectrum. Each of the electronic keys authorizes the medical institution to use at least a portion of the MBAN spectrum. The system further includes a channel regulator generating by a processor one or more channel use rules based on the received electronic keys. The channel use rules authorize MBAN systems of the medical institution to use the at least a portion of the MBAN spectrum. Even more, the system includes one or more access points and/or ports notifying the MBAN systems of presently authorized portions of the MBAN spectrum based on the channel use rules.

In accordance with another aspect, a method for conveying an electronic key throughout a medical institution is provided. The method includes receiving one or more electronic keys from a coordinator of an MBAN spectrum. Each of the electronic keys authorizes the medical institution to use at least a portion of the MBAN spectrum. Further, one or more channel use rules are generated by a processor based on the electronic keys. The channel use rules authorize MBAN systems of the medical institution to use the at least a portion of the MBAN spectrum. The MBAN systems are further notified of presently authorized portions of the MBAN spectrum based on the channel use rules.

One advantage resides in automatic deployment of electronic keys through a medical institution.

Another advantage resides in compatibility with different types of medical body area network (MBAN) systems.

Another advantage resides in real-time MBAN spectrum usage and/or deployment monitoring.

Another advantage resides in allocation of MBAN spectrum based on MBAN spectrum usage and deployment.

Another advantage resides in allocation of MBAN spectrum based on device type.

Another advantage resides in allocation of MBAN spectrum based on coverage area of an access point and/or port.

Still further advantages of the present invention will be appreciated to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figures 1, 3:
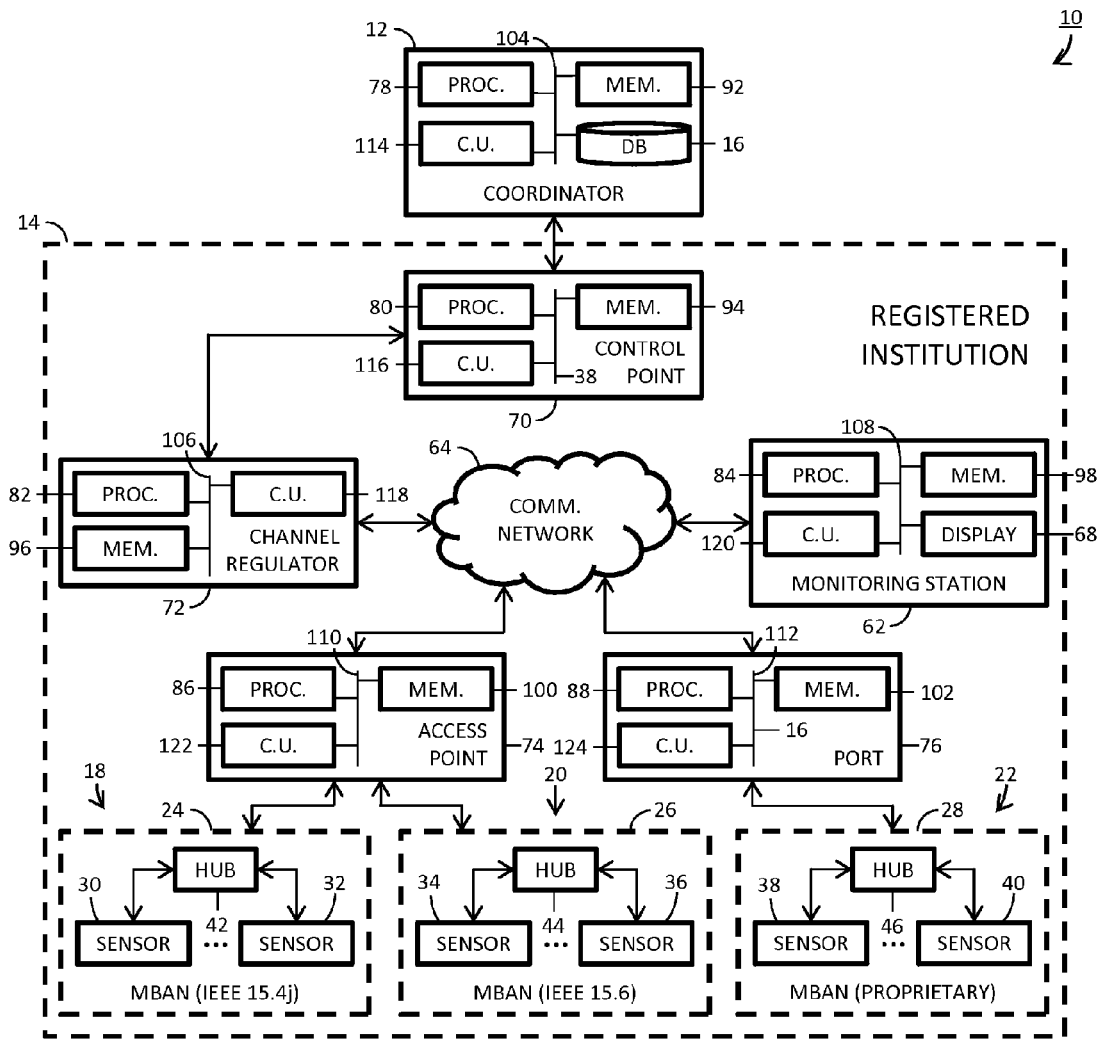
FIG. 1 illustrates a block diagram of an electronic key conveyance system.
FIG. 3 illustrates a format for a channel use rule.
Figures 2, 4, 5:
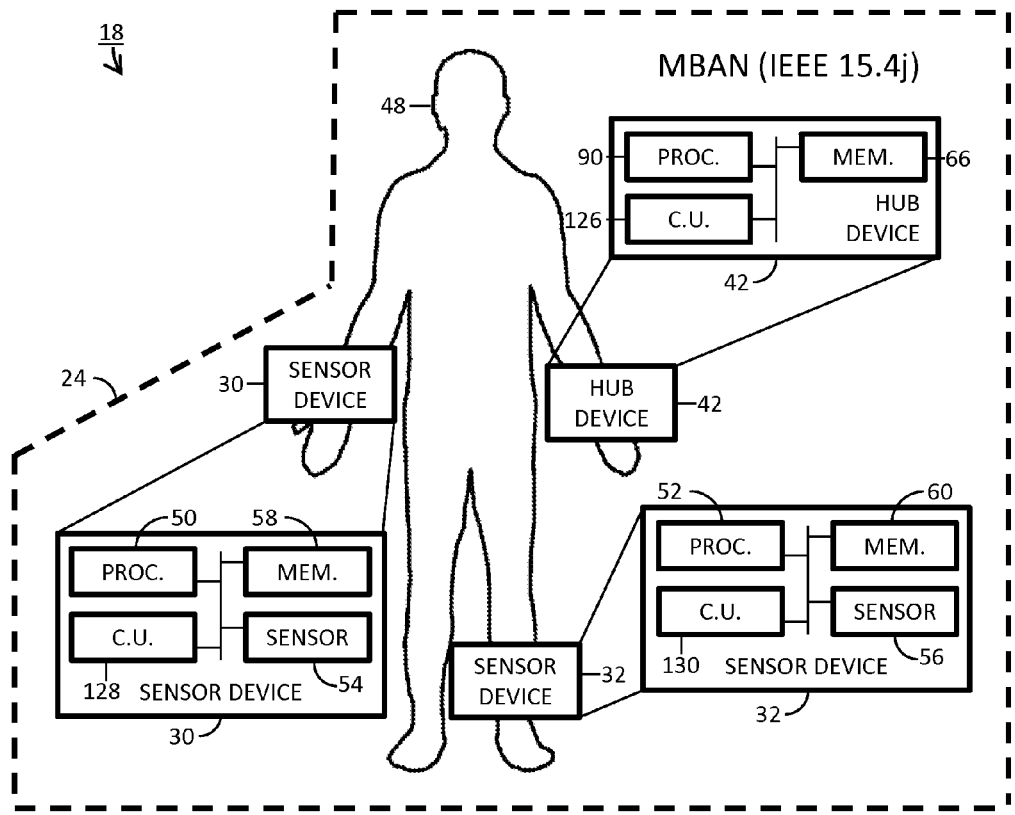
FIG. 2 illustrates a block diagram of a medical body area network (MBAN) system.
FIG. 4 illustrates a queue of an access point and/or port including a single channel use rule.
FIG. 5 illustrates a channel use rule.

With reference to FIGS. 1 and 2, an electronic key conveyance system 10 is provided. The system 10 includes a medical body area network (MBAN) coordinator 12. The MBAN coordinator 12 coordinates the use of at least a portion of an MBAN spectrum, such as 2360-2390 MHz, by one or more medical institutions 14 registered with the MBAN coordinator 12. Typically, the MBAN spectrum is spectrum authorized by a governmental agency, such as the Federal Communications Commission (FCC), for use on a secondary basis by the registered medical institutions 14. The MBAN coordinator 12 coordinates the use of the MBAN spectrum according to one or more coordination rules determined by the authorizing party, typically to protect primary users.

Through application of the rules, the MBAN coordinator 12 selectively authorizes the registered medical institutions 14 to use the MBAN spectrum by distributing electronic keys to the registered medical institutions 14. An electronic key for a registered medical institution includes information about the frequencies of the MBAN spectrum the registered medical institution is authorized to use, optionally with time restrictions (e.g., time periods for MBAN operations, effective time/date, and expiration time/date) and/or a unique ID for the registered medical institution. The electronic keys can be provided to the registered medical institutions 14 in any manner suitable for transporting data, such as automatically via a network or manually via email or the like.

At least one database 16 of the MBAN coordinator 12 maintains data on current authorizations to facilitate coordination. For example, the MBAN coordinator 12 can track current authorizations to ensure the primary users are properly protected. Further, in some embodiments, the MBAN coordinator 12 maintains registration records for each of the registered medical institutions 14 in the database 16. Each of the registration records suitably includes a unique ID for the corresponding medical institution and optionally data regarding electronic keys issued to the medical institution and/or data required for registration, such as name, address, phone number, etc.

The registered medical institutions 14 each include one or more MBAN systems 18, 20, 22. The MBAN systems 18, 20, 22 each employ an MBAN communication standard, such as one of IEEE 802.15.6, IEEE 802.15.4j, and a proprietary standard, to create an MBAN 24, 26, 28. The frequencies used by the MBAN systems 18, 20, 22 are determined based on channel use rules, discussed hereafter, and suitably fall within the MBAN spectrum. Further, the MBAN systems 18, 20, 22 each include one or more sensor devices 30, 32, 34, 36, 38, 40 and a hub device 42, 44, 46 communicating over the MBAN 24, 26, 28.

The sensor devices 30, 32, 34, 36, 38, 40 each capture physiological data of an associated patient 48 and transmit the captured physiological data to the hub device 42, 44, 46 using the MBAN 24, 26, 28. The physiological data includes calculations by one or more processors 50, 52 of the sensor devices 30, 32, 34, 36, 38, 40 and/or measurements by one or more sensors 54, 56 of the sensor devices 30, 32, 34, 36, 38, 40 of at least one physiological parameters typically generated at a predetermined sample rate, such as 1 second. Examples of physiological parameters includes heart rate, respiration rate, blood pressure, ECG signals, and so forth. In some embodiments, the sensor devices 30, 32, 34, 36, 38, 40 buffer the captured physiological data in one or more memories 58, 60 thereof until the amount of buffered physiological data exceeds a predetermined amount. The sensor devices 30, 32, 34, 36, 38, 40 are typically disposed on the exterior of the patient 48. However, in some embodiments, the sensor devices 30, 32, 34, 36, 38, 40 are additionally or alternatively disposed in the patient 48 and/or proximate to the patient 48.

The hub device 42, 44, 46 receives the captured physiological data from the sensor devices 30, 32, 34, 36, 38, 40 using the MBAN 24, 26, 28 and relays the captured physiological data to a monitoring station 62 of the corresponding one of the registered medical institution 14 over a communication network 64 of the registered medical institution, different than the MBAN 24, 26, 28. The communication network 64 includes, for example, one or more of a local area network, a wide area network, a virtual private network, and so on. In some embodiments, upon receiving the captured physiological data, the hub device 42, 44, 46 immediately relays it to the monitoring station 62. In other embodiments, the hub device 42, 44, 46 buffers the received physiological data in a memory 66 thereof until the amount of buffered physiological data exceeds a predetermined amount. In addition to relaying the physiological data, the hub device 42, 44, 46 acts as a personal area network (PAN) coordinator for the MBAN system and sets up the MBAN 24, 26, 28, controls association/disassociation of the sensor devices 30, 32, 34, 36, 38, 40 with the MBAN 24, 26, 28, and so on. The hub device 42, 44, 46 is typically disposed proximate to the patient 48 and/or one of a local bedside monitoring unit, a cell phone, a set-top-box, or other wireless device.

The monitoring station 62 facilitates monitoring of patients for degradation using the physiological data captured by the sensor devices 30, 32, 34, 36, 38, 40 of the MBAN systems 18, 20, 22. Upon receiving physiological data from a hub device, in some embodiments, the monitoring station 62 determines whether to issue an alarm by matching the received physiological data to alarm criteria. For example, in some embodiments, an alarm may be issued if at least one physiological parameter exceeds a threshold. It is contemplated that the alarm criteria can take in to account the present values of physiological parameters, as well as trends of physiological parameters. Further, upon receiving the physiological data, in some embodiments, the received physiological data is displayed on a display device 68 of the monitoring station 62 and/or a display device remote from the monitoring station 62 via the communication network 64.

Each of the registered medical institutions 14 further includes an MBAN control point 70 and an MBAN channel regulator 72. The MBAN control point 70 receives one or more electronic keys assigned to the registered medical institution by the MBAN coordinator 12. The MBAN control point 70 can receive the electronic keys automatically or manually from the MBAN coordinator 12. The MBAN channel regulator 72 receives the electronic key from the MBAN control point 70 via a pull or push method and serves as an interface between the MBAN control point 70 and the MBAN systems 18, 20, 22 of the registered medical institution. It translates the electronic keys into channel use rules for different types of MBAN systems (i.e., MBAN systems employing different MBAN communication standards). For example, a registered medical institution can employ an MBAN system employing a proprietary MBAN communication standard and an MBAN system employing the IEEE 802.15.6 MBAN communication standard. In such a case, the MBAN channel regulator 72 generates a channel use rule for the proprietary MBAN system and another channel use rule for the IEEE 802.15.6 MBAN system.

With reference to FIG. 3, an exemplary format for channel use rules is provided, including one or more of MBAN device type, rule version number, effective time/date, expiration time/date and prioritized candidate channel list. MBAN device type indicates for which type of MBAN devices, such as IEEE 802.15.6 MBAN devices, the rule is defined. Rule version number indicates the version number of the rule and allows version control. Effective time/date indicates when the rule takes effect. Expiration time/date indicates when the rule expires. Prioritized candidate channel list conveys information about the frequencies authorized by an electronic key received from the MBAN coordinator 12. In some embodiments, a prioritized candidate channel list is an ordered list of channel indices that correspond to the wireless channels that fall in the MBAN spectrum authorized by the electronic key. In such embodiments, a prioritized candidate channel list can be encoded in a format as below:

$$(L, I_1, I_2, \ldots, I_L),$$

where L is the length of the list and $I_j$ (j=1, ..., L) are channel indices. $I_i$ has a higher priority than $I_j$ if i<j, whereby MBAN devices governed by this channel rule would consider using channel I, before channel $I_j$ if both channels are available for use by that MBAN device.

As an example, IEEE 802.15.6 defines 39 channels in the MBAN spectrum (i.e., 2360-2400 MHz) as fc(k)=2361+1.00*k MHz, where the channel index k=0, 1, ... 38. Further, a proprietary MBAN standard can define 19 channel in the MBAN spectrum as fc(k)=2362+2.00*k MHz, where the channel index k=0, 1, ... 18. If a registered medical institution receives an electronic key from the MBAN coordinator 12 authorizing use of the 2360-2370 MHz spectrum, then all MBAN systems within the registered medical institution would be authorized to access the 2360-2370 MHz spectrum and the 2390-2400 MHz spectrum. Therefore, the allowed channels for IEEE 802.15.6 MBAN devices are channels 0, 1, 2, ... 8, 30, 31, 32 ..., 37 and 38, while the allowed channels for MBAN devices employing the proprietary MBAN standard are channels 0, 1, 2, 3, 15, 16, 17, and 18. Hence, the MBAN channel regulator 72 can define a prioritized candidate channel list for the IEEE 802.15.6 MBAN devices as (18, 0, 1, 2, ..., 7, 8, 30, 31, 32 ..., 38), where L=18, and define another prioritized candidate channel list for the MBAN devices employing the proprietary MBAN standard as (8, 18, 17, 16, 15, 3, 2, 1, 0), where L=8.

In some embodiments, the MBAN channel regulator 72 generates channel use rules to prevent overlapping usage of the MBAN spectrum by different types of MBAN systems close to each other. This can be performed by defining the prioritized candidate channel lists of different types of MBAN systems to access the MBAN spectrum from different ends. For example, IEEE 802.15.6 MBAN devices can access the low frequency end (i.e., from 2360 MHz towards 2400 MHz) and IEEE 802.15.4j MBAN devices can access the high frequency end (i.e., from 2400 MHz towards 2360 MHz). Therefore, in most cases co-located devices employing different MBAN communication standards will use different parts of the authorized spectrum and the possibility of mutual interference is reduced.

The MBAN channel regulator 72 suitably communicates the channel use rules to the MBAN systems 18, 20, 22 over the communication network 64 via one or more access points and/or ports 74, 76 of the communication network 64 every time it generates a new channel use rule. The access points and/or ports 74, 76 connect the MBAN systems 18, 20, 22 to the communication network 64. Access points and/or ports include, for example, 802.11a, b, g, n wireless access points, ports of a switch or hub, and so on. In some embodiments, the channel use rules are sent directly to the MBAN systems 18, 20, 22 through the access points and/or ports 74, 76 and the MBAN channel regulator 72 maintains a queue of the generated channel use rules for each individual access point and/or port 74, 76. Such a queue is ordered based on the effective time/date field of the channel use rules. Every time a new channel use rule is generated by the MBAN channel regulator 72 for an access point and/or port, the MBAN channel regulator updates the queue of that access point and/or port according to the new channel use rule.

However, typically, the channel use rules are sent to the access points and/or ports 74, 76, which distribute the channel use rules to the MBAN systems 18, 20, 22. Where the access points and/or ports 74, 76 distribute the channel use rules to the MBAN systems 18, 20, 22, each access point and/or port maintains received channel use rules in a queue. Such a queue is ordered based on the effective time/date field of the channel use rules. Every time an access point and/or port receives a channel use rule from the MBAN channel regulator 72, it updates its queue according to the channel use rule. To update a queue based on a received channel use rule, the access point and/or port determines whether the time period (i.e., from the effective time/date to the expiration time/date) of the received channel use rule is overlapped with the time period of any channel use rule in the queue, which is defined for the same type of MBAN systems. If there is no rule in the queue that has an overlapping time period with the received channel use rule, the access point and/or port inserts the received channel use rule into the queue and reorders the queue based on the effective time/date. If there exists one or more channel use rules in the queue that have overlapping time periods with the received channel use rule and also have the same MBAN device type as the received channel use rule, then, for each channel use rule in the queue that has an overlapping period with the received channel use rule and has the same MBAN device type as the received channel use rule, the access point and/or port checks if it has a newer rule version number than the received channel use rule. If yes, then no update is needed for this channel use rule in the queue. If no, then, for the overlapped time period, this channel use rule is replaced by the received channel use rule. The queue is then reordered based on effective time/date. When a channel use rule in the queue expires, the access point and/or port removes the rule from the queue.

Figures 6, 7, 8:
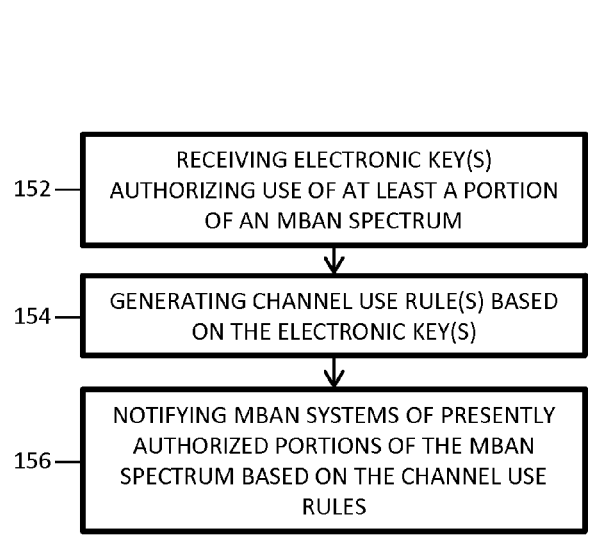
FIG. 6 illustrates the queue of FIG. 4 after adding the channel use rule of FIG. 5.
FIG. 7 illustrates a format for an electronic key information element.
FIG. 8 illustrates a block diagram of a method for conveying an electronic key from an MBAN coordinator to MBAN devices of a medical institution.

To illustrate the operation of the queue, attention is directed to FIGS. 4-6. As shown in FIG. 4, an access point and/or port only has a single channel use rule (Rule 1) in its queue. This channel use rule is for Type-B MBAN devices and has a rule version number of 1, an effective time/date of 2011-07-02 12:01 am, an expiration time/date as N/A, which means this rule will never expire, and a prioritized candidate channel list of (18, 0, 1,2, . . . ,7,8,30,31, . . . ,38), which, for example, means channels in the 2360-2370 MHz and 2390-2400 MHz are enabled by an electronic key. Later on, the MBAN channel regulator 72 gets a new electronic key from the MBAN control point 72 that disables the use of the 2360-2390 MHz spectrum for the time period from 2011-09-02 12:01 am to 2011-10-02 12:00 am. This, in turn, leads the MBAN channel regulator 72 to generate a new channel use rule to enable only channels in the 2390-2400 MHz band, as shown in FIG. 5. The MBAN channel regulator 72 communicates the new channel rule to the access point and/or port. Upon receipt of the new rule, the access point and/or port updates the queue. Since the effective time period of the new rule overlaps with that of Rule 1 and the overlapped period is from 2011-9-02 12:01 am to 2011-9-02 12:00 am, the new rule, which has a newer version number (i.e., 2), replaces Rule 1 in the overlapped time period. After updating the queue, the queue is as shown in FIG. 6. For the non-overlapped time periods (i.e., 2011-07-02 12:01 am to 2011-07-02 12:01 am and 2011-10-02 12:01 am to N/A), Rule 1 still works, but with updated effective/expiration time/dates.

The currently effective channel use rule (i.e., the rule governing the current time period) in the queue of an access point and/or port is forwarded to each MBAN hub device that maintains a connection (or association) with the access point and/or port. When an MBAN hub device sends a connection request to an access point and/or port, it send its MBAN device type parameter. If the access point and/or port accepts the connection request, it sends its currently effective channel use rule for the MBAN type indicated in the connection request to the MBAN hub device as part of its connection response. In some embodiments, the effective channel use rule is represented as an electronic key information element, including fields for one or more of healthcare facility ID (i.e., unique ID for the registered medical institution), MBAN device type, rule version number, expiration time/date and prioritized candidate channel list. An example of such an electronic key information element is shown in FIG. 7.

In addition to forwarding currently effective channel use rules when a connection (or association) is initiated, an access point and/or port can broadcast currently effective channel use rule. In some embodiments, in response to a change in a current effective channel use rule for a type of MBAN device, a group broadcast message is sent to each connected (or associated) MBAN hub device of the type. In such an embodiment, the group broadcast messages includes an electronic key information element for the currently effective channel use rule in the queue. Further, in some embodiments, an access point and/or port periodically sends, for each type of MBAN hub device connected (or associated) therewith, a group broadcast message to each connected (or associated) MBAN hub device of the type. In such an embodiment, the group broadcast messages includes an electronic key information element for the currently effective channel use rule in the queue corresponding the type.

When a hub device receives an electronic key information element, the hub devices typically enables the channels defined in the priority candidate channel list and picks one from the list for the MBAN. However, in some embodiments, before doing so, the hub device verifies values, such as healthcare facility ID and/or device type, in the electronic key information element are valid. For example, the hub device verifies healthcare facility ID and/or device type of the electronic key information element match corresponding values associated with the hub device. If no, it will not follow the electronic key information element and, optionally, sends an error report to the access point and/or port that provided the electronic key information element. If yes, it will enable the channels defined in the priority candidate channel list and pick one from the list for the MBAN.

In some embodiments, after selecting the channel from the priority candidate channel list, the MBAN hub device broadcasts a beacon on the selected channel. The beacon includes a "key" to enable a sensor device to do transmission on the selected channel. The "key" can be anything. However, in some embodiments, the "key" is the healthcare facility ID. In other embodiments, the "key" is an encrypted value of healthcare facility ID and beacon number (i.e., key=encrypt function (healthcare facility ID, beacon number)) based on a private key known by the sensor device.

To enable the channels defined in the priority candidate channel list of a received electronic key information element, the hub device conveys the priority candidate channel list to sensor devices of the MBAN. Such a channel list is useful to help a sensor devices to find its hub device when it loses connections with the hub device. Once a sensor device that associates with the hub device receives a prioritized channel list from the hub device, it will check if the version is newer than what it has. If yes, the sensor device will update its list and version number accordingly.

A hub device conveys its priority candidate channel list when a sensor device connects (or associates) with the hub device. In some embodiments, to connect to an MBAN, an MBAN sensor device performs a channel scan to find the hub device it wants to associate with. Once the sensor device receives a beacon from its desired hub device, it performs decryption transformation and authentication checking transformation on the received "key" to verify if the "key" is valid (e.g., it checks if the received healthcare facility ID is the same as the one it has and the MBAN network ID is correct). If the "key" is valid, the sensor device is granted access to the current channel. It can transmit its connection (or association) request to the hub device to start the association (or connection) process. If the hub device accepts the connection request, it sends a prioritized candidate channel list with rule version number to the MBAN sensor device as part of its connection response.

In addition to conveying a priority candidate channel list when a connection (or association) is initiated, a hub device conveys its priority candidate channel list to sensor devices of the MBAN via broadcasts. For example, the hub device can broadcast its prioritized candidate channel list with rule version number to its slave devices in its beacons when the priority candidate channel list is updated. As another example, the hub device can broadcast its prioritized candidate channel list with rule version number to its slave devices in its beacon periodically.

In some embodiments, the MBAN channel regulator 72 customizes channel use rules of at least some of the access points and/or ports 74, 76 of the communication network 64 based on real-time MBAN spectrum usage/deployment situation in the coverage area of the access points and/or ports 74, 76. When the MBAN spectrum usage/deployment situation in the coverage area of an access point and/or port is changed (e.g., due to patients' movements), the access point and/or port reports such change to the MBAN channel regulator 72, which evaluates if a new set of channel use rules are needed for the access point and/or port. If so, the MBAN channel regulator 72 updates the channel use rules for that access point and/or port and communicates the updated rules to the access point and/or port.

The MBAN channel regulator 72 can customizes the channel use rule(s) of at least some of the access points and/or ports 74, 76 of the communication network 64 by allocating additional spectrum to the access points and/or ports 74, 76 as demand increases. For example, if an access point and/or port only has a few MBAN devices operating in its coverage area, the 2390-2400 MHz spectrum might be enough to support those MBAN operations. The MBAN channel regulator 72 can customize the channel use rules of that access point and/or port to just enable MBAN channels within the 2390-2400 MHz band even though there might be some channels that are in the authorized spectrum of the 2360-2390 MHz band. This can reduce the MBAN operations within the 2360-2390 MHz spectrum and avoid possible interference to primary users. If more and more MBAN devices move to and operate in the coverage area of that access point and/or port and more spectrum is needed to support MBAN operations, the MBAN channel regulator 72 can be triggered and generate new channel use rules for that access point and/or port to enable more channels that are authorized by the electronic key for MBAN use.

The MBAN channel regulator 72 can also customize the channel use rule(s) of at least some of the access points and/or ports 74, 76 of the communication network 64 to promote coexistence of MBAN devices employing different MBAN communication standards by dynamically allocating the authorized spectrum to different types of MBANs. In that regard, the MBAN channel regulator 72 can use customized channel use rules to divide the MBAN spectrum into several non-overlapping sub-bands and allocate those non-overlapping sub-bands to each type of MBAN device to avoid different types of MBAN devices operating on the same frequencies.

For example, there could be 2 IEEE 802.15.6 MBAN systems and 10 IEEE 802.15.4j MBAN systems operating in the coverage area of a first access point and/or port and 4 IEEE 802.15.6 MBAN systems and 8 IEEE 802.15.4j MBAN systems operating in the coverage area of a second access point and/or port. The MBAN channel regulator 72 can generate different channel use rules for the first access point and/or port and the second access point and/or point. For the first access point and/or port, the MBAN channel regulator 72 can define the channel use rule for the IEEE 802.15.6 MBAN systems to have the prioritized candidate channel list as (3, 18, 17, 16) and the channel use rule for the IEEE 802.15.4j MBAN systems to have the prioritized candidate channel list as (11, 0, 1, 2, . . . , 7, 8, 30, 31). For the second access point and/or port, the MBAN channel regulator 72 can define the channel use rule for IEEE 802.15.6 MBAN systems to have the prioritized candidate channel list as (4, 18, 17, 16, 15) and the channel use rule for IEEE 802.15.4j MBAN systems to have the prioritized candidate channel list as (9, 0, 1, 2, . . . , 7, 8).

Each component of the system 10 includes at least one processor 50, 52, 78, 80, 82, 84, 86, 88, 90 executing computer executable instructions on at least one memory 58, 60, 66, 92, 94, 96, 98, 100, 102 thereof. Components include the MBAN coordinator 12 and, for each of the registered medical institutions 14, the MBAN control point 70, the MBAN channel regulator 72, the monitoring station 62, the access points and/or ports 74, 76, and the MBAN devices (i.e., the sensor devices 30, 32, 34, 36, 38, 40 and the corresponding hub device 42, 44, 46). The computer executable instructions embody respective functionality of the component. For example, the computer executable instructions embody coordination for the MBAN coordinator 12. As another example, the computer executable instructions embody measuring physiological parameters for the sensor devices. Further, at least some of the components each include at least one system bus 104, 106, 108, 110, 112 to exchange data between sub-components. Sub-components include processors, memories, databases, sensors, display devices, communication units, and so on.

In addition, at least some of the components each include a communication unit 114, 116, 118, 120, 122, 124, 126, 128, 130. A communications unit provides a corresponding processor with an interface to at least one communication network. For the MBAN coordinator 12, the communication unit 114 provides the processor 78 with an interface to the registered medical institutions 14. For the sensor devices 30, 32, 34, 36, 38, 40, the communication units 128, 130 provide the processors 50, 52 thereof with an interface to the MBANs 24, 26, 28. For the hub devices 42, 44, 46, the communication units 126 provide the processors 90 with an interface to the MBANs 24, 26, 28 and the communication networks 64. For the access points and/or ports 74, 76, the communication units 122, 124 provide the processors 86, 88 thereof with an interface to the MBAN systems 18, 20, 22 and the communication networks 64. For the monitoring stations 62, the communication units 120 provides the processors 84 thereof with an interface to the communication networks 64. For the MBAN channel regulators 72, the communication units 118 provides the processors 82 thereof with an interface to the communication networks 64 and the MBAN control points 70 (e.g., over the communication networks 64, other communication networks, direct links, and so on). For the MBAN control points 70, optional communication units 116 provides the processors 80 thereof with an interface to the MBAN channel regulators 72 and/or the MBAN coordinator 12 (e.g., over the Internet).

In some embodiments, the above scheme for conveying electronic key information to the MBAN devices is implemented as part of MAC or high layer communication protocols employed by the MBAN devices and the access points and/or ports 74, 76. Further, in some embodiments, components of the system 10 are combined. For example the MBAN control point 70 and the MBAN channel regulator 76 can be combined.

With reference to FIG. 8, a method 150 for conveying an electronic key throughout one of the medical institutions 14 is provided. The method 150 includes receiving 152 one or more electronic keys from the coordinator 12. Each of the electronic keys authorizes the medical institution 14 to use at least a portion of the MBAN spectrum. One or more channel use rules are generated 154 by a processor, such as the processor 82 of the channel regulator 72, based on the electronic keys. The channel use rules authorize the MBAN systems 18, 20, 22 of the medical institution 14 to use the at least a portion of the MBAN spectrum. The MBAN systems 18, 20, 22 are further notified 156 of presently authorized portions of the MBAN spectrum based on the channel use rules.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

The invention has been described with reference to the preferred embodiments. Modifications and alterations may occur to others upon reading and understanding the preceding detailed description. For example, although discussed in connection with MBANs, the present disclosure finds application in other opportunistic cognitive radio systems where spectrum sharing is required. It is intended that the invention be construed as including all such modifications and alterations insofar as they come within the scope of the appended claims or the equivalents thereof.

The invention claimed is:

1. A electronic key conveyance system of a medical institution, comprising:
   a control point receiving one or more electronic keys from a coordinator of an MBAN spectrum, each of the electronic keys authorizing the medical institution to use at least a portion of the MBAN spectrum;
   a channel regulator separate from the coordinator, the channel regulator generating by a processor one or more channel use rules based on the electronic keys, the channel use rules authorizing MBAN systems of the medical institution to use the at least a portion of the MBAN spectrum; and,
   one or more access points and/or ports receiving the channel use rules from the channel regulator and notifying the MBAN systems of presently authorized portions of the MBAN spectrum based on the channel use rules.

2. The system according to claim 1, wherein each of the electronic keys includes time restrictions on use of the at least a portion of the MBAN spectrum.

3. The system according to claim 1, wherein the coordinator coordinates use of the MBAN spectrum by one or more medical institutions, including the medical institution, registered with the coordinator, wherein the registered medical institutions are secondary users of the MBAN spectrum, and wherein the coordinator coordinates the use of the MBAN spectrum by the registered medical institutions to protect primary users of the MBAN spectrum.

4. The system according to claim 1, wherein the MBAN spectrum is 2360-2390 MHz.

5. The system according to claim 1, wherein each of the channel use rules includes an MBAN type and a listing of authorized channels for the MBAN type, the MBAN type corresponding to MBAN communication standard.

6. The system according to claim 1, wherein at least one of the channel rules includes a version and/or time restrictions.

7. The system according to claim 1, wherein the channel regulator generates the channel use rules to prevent overlapping usage of the MBAN spectrum by different MBAN types.

8. The system according to claim 1, wherein the channel regulator receives MBAN spectrum usage and/or deployment information from the access points and/or ports for corresponding coverage areas, and wherein the channel regulator generates the channel use rules based on the MBAN spectrum usage and/or deployment information.

9. The system according to claim 1, wherein the channel regulator dynamically adjusts allocation of the at least a portion of the MBAN spectrum between the access points and/or ports based on demand of the access points and/or ports.

10. The system according to claim 1, wherein at least one of the channel use rules is specific to one of the access points and/or ports.

11. A electronic key conveyance system of a medical institution, comprising:
   a control point receiving one or more electronic keys from a coordinator of an MBAN spectrum, each of the electronic keys authorizing the medical institution to use at least a portion of the MBAN spectrum;
   a channel regulator generating by a processor one or more channel use rules based on the electronic keys, the channel use rules authorizing MBAN systems of the medical institution to use the at least a portion of the MBAN spectrum; and,
   one or more access points and/or ports receiving the channel use rules from the channel regulator and notifying the MBAN systems of presently authorized portions of the MBAN spectrum based on the channel use rules;
   wherein each of the access points and/or ports maintains channel use rules received from the channel regulator in a queue and notifies MBAN systems connecting and/or associated therewith of presently authorized portions of the MBAN spectrum based on the channel use rules in the queue.

12. The system of claim 11, wherein the access points and/or ports are configured to updated the queue by:
   determining whether a time period of the received channel use rule overlaps with a time period of any channel use rule in the queue;
   inserting the received channel rule into the queue and reordering the queue when there is no overlap; and
   checking whether the access points and/or ports has a newer rules version number than the received channel rule when there is an overlap and the channel use rule has the same MBAN device type;
   replacing the channel use rule with the received channel having the newer rules version number when a newer rules version number than the received channel rule exists.

13. A method for conveying an electronic key throughout a medical institution, comprising:
   receiving one or more electronic keys from a coordinator of an MBAN spectrum, each of the electronic keys authorizing the medical institution to use at least a portion of the MBAN spectrum;
   generating, by a processor that is separate from the coordinator, one or more channel use rules based on the electronic keys, the channel use rules authorizing MBAN systems of the medical institution to use the at least a portion of the MBAN spectrum, wherein each of the channel use rules includes an MBAN type and a listing of authorized channels for the MBAN type, the MBAN type corresponding to MBAN communication standard, and the channel use rules are generated to prevent overlapping usage of the MBAN spectrum by different types of MBAN systems; and,
   notifying the MBAN systems of presently authorized portions of the MBAN spectrum based on the channel use rules.

14. The method according to claim 13, wherein each of the electronic keys includes time restrictions on use of the at least a portion of the MBAN spectrum.

15. The method according to claim 13, wherein the coordinator coordinates use of the MBAN spectrum by one or more medical institutions, including the medical institution, registered with the coordinator, wherein the registered medical institutions are secondary users of the MBAN spectrum, and wherein the coordinator coordinates the use of the MBAN spectrum by the registered medical institutions to protect primary users of the MBAN spectrum.

16. The method according to claim 13, wherein the MBAN spectrum is 2360-2390 MHz.

17. The method according to claim 13, wherein each of the channel use rules further includes a version and time restrictions.

18. The method according to claim 13, wherein the notifying is performed by one or more access points and/or ports, the method further including:
  receiving MBAN spectrum usage and/or deployment information from the access points and/or ports for corresponding coverage areas, wherein the channel use rules are generated based on the MBAN spectrum usage and/or deployment information.

19. The method according to claim 13, wherein the notifying is performed by one or more access points and/or ports, said method further including:
  dynamically adjusting allocation of the at least a portion of the MBAN spectrum between the access points and/or ports based on demand of the access points and/or ports.

20. A non-transitory computer readable medium carrying software for controlling one or more processors to perform the method according to claim 13.

* * * * *